United States Patent

Hartigan

[11] Patent Number: 5,529,341
[45] Date of Patent: Jun. 25, 1996

[54] RESTRAINING NET FOR PASSENGER VEHICLES

[76] Inventor: Gail J. Hartigan, R.R. 2, Box 58, Council Bluffs, Iowa 51503

[21] Appl. No.: 342,572
[22] Filed: Nov. 21, 1994
[51] Int. Cl.$^6$ ............................................. B60R 21/06
[52] U.S. Cl. ........................ 280/749; 297/487; 5/118
[58] Field of Search ......................... 280/749, 748, 280/751; 297/487, 488, 485, 464; 5/118, 424, 425, 94; 296/24.1

[56] References Cited

U.S. PATENT DOCUMENTS

| | | | |
|---|---|---|---|
| D. 344,388 | 2/1994 | Fellion | D34/35 |
| 2,706,819 | 1/1955 | McClure | 5/94 |
| 3,169,781 | 2/1965 | Abruzzino | 280/749 |
| 3,365,231 | 1/1968 | Burtt | 280/748 |
| 3,478,394 | 11/1969 | Davis | 24/75 |
| 3,692,327 | 9/1972 | Barrick, Sr. et al. | 280/749 |
| 3,695,698 | 10/1972 | Trump | 280/749 |
| 3,961,585 | 6/1976 | Brewer | 105/469 |
| 4,043,582 | 8/1977 | Lyter | 280/749 |
| 4,924,814 | 5/1990 | Beaudet | 280/749 |
| 4,943,105 | 7/1990 | Kacar et al. | 5/94 |
| 4,960,293 | 10/1990 | Bottinick et al. | 280/749 |
| 5,186,587 | 2/1993 | Moore | 280/749 |
| 5,290,086 | 3/1994 | Tucker | 280/749 |
| 5,375,879 | 12/1994 | Williams et al. | 280/749 |

FOREIGN PATENT DOCUMENTS 2735338  2/1979  Germany ............................. 297/487

Primary Examiner—Margaret A. Focarino
Assistant Examiner—Peter C. English
Attorney, Agent, or Firm—Zarley, McKee, Thomte, Voorhees & Sease; Mark D. Frederiksen

[57] ABSTRACT

A restraining net includes a rectangular mesh of strands interconnected to form a screen-like mesh, and affixed within a support frame of upper, lower, and transverse straps. A pair of upper belts extend from the upper strap and are releasably connected to the shoulder belts of a passenger vehicle positioned above the seat back of the vehicle adjacent the transverse ends of the seat. A pair of lower belts extend from the lower strap and are releasably connected to the frame of the seat.

6 Claims, 3 Drawing Sheets

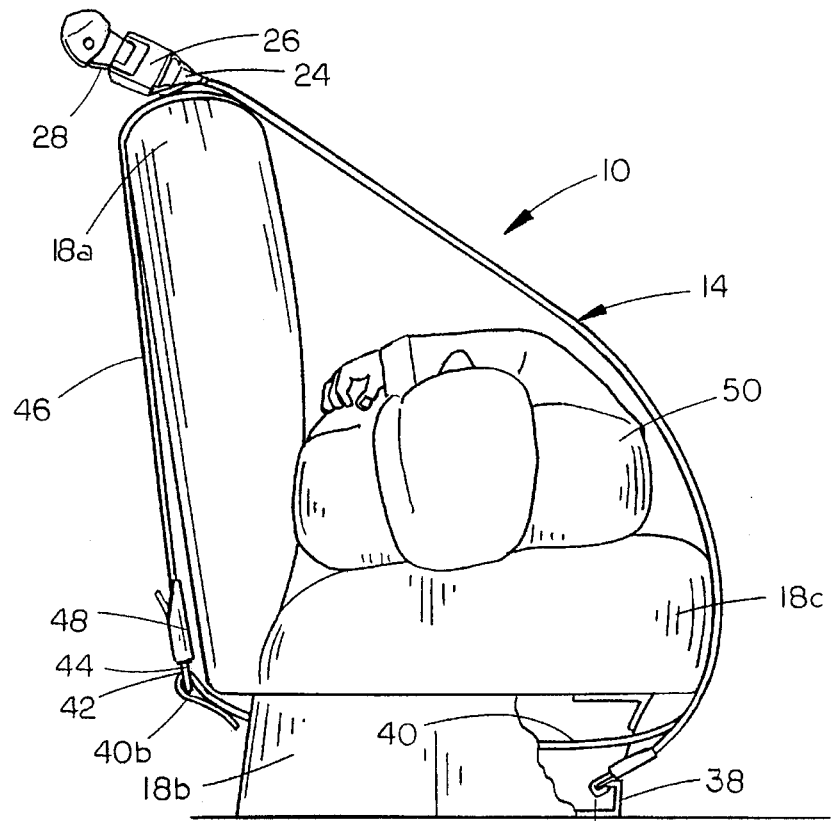
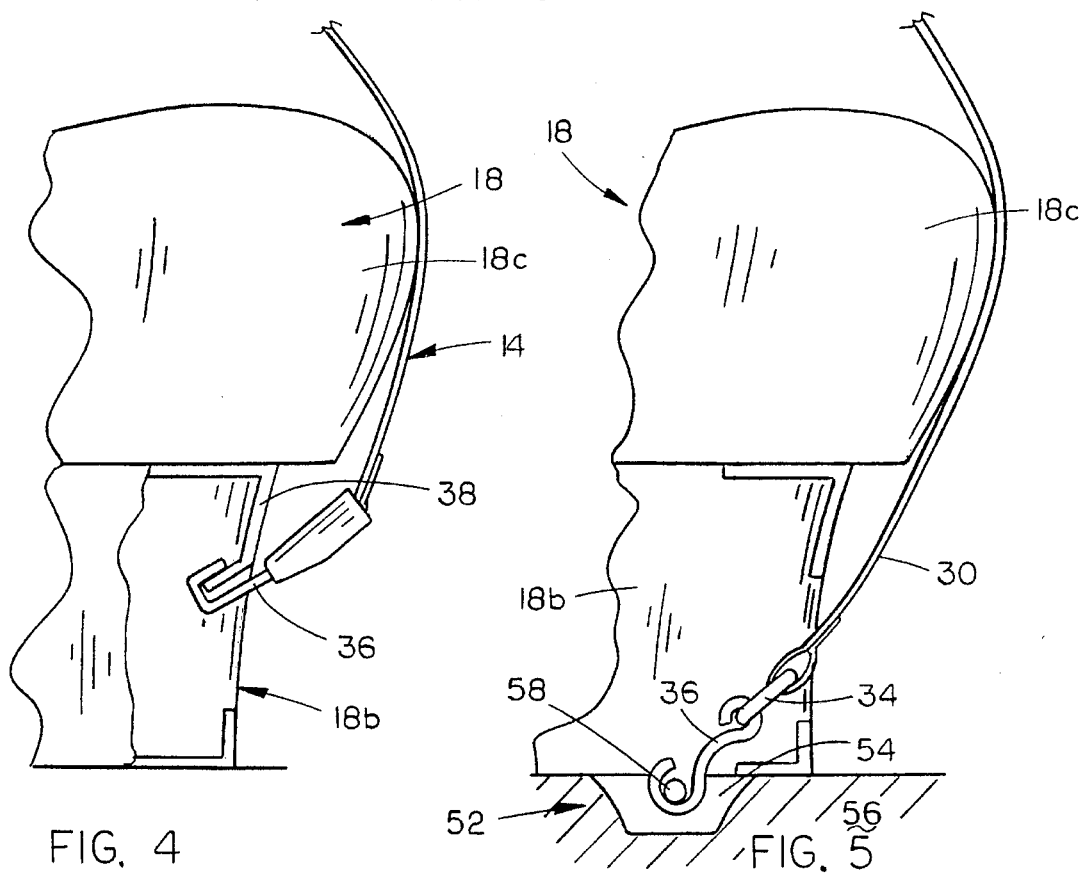

5,529,341

RESTRAINING NET FOR PASSENGER VEHICLES

TECHNICAL FIELD

The present invention relates generally to restraint systems for passenger vehicles, and more particularly to an improved restraining net for restraining a laying person on a vehicle seat.

BACKGROUND OF THE INVENTION

Various restraining systems for passenger vehicles are utilized to retain a person in the sitting position in a passenger vehicle seat during an accident. Safety belts across the waist and over the shoulder are the primary restraint system present in current passenger vehicles. While the conventional seat belts and shoulder belts are effective restraints for the upright passenger, they are extremely confining and do not permit an individual to lay down along the seat.

SUMMARY OF THE INVENTION

It is therefore a general object of the present invention to provide an improved restraint for passenger vehicles which permits an individual to lay down on the seat and maintain the effectiveness of the restraint.

Another object is to provide a passenger vehicle restraint which may be connected to the existing passenger vehicle without modification thereto.

Still another object of the present invention is to provide an improved passenger vehicle restraint which may be adjusted to fit a particular passenger vehicle.

Yet another object is to provide an improved passenger vehicle restraint which is economical to manufacture, simple to use, and light weight.

These and other objects will be apparent to those skilled in the art.

The restraining net of the present invention includes a rectangular mesh of strands interconnected to form a screen-like mesh, and affixed within a support frame of upper, lower, and transverse straps. A pair of upper belts extend from the upper strap and are releasably connected to the shoulder belts of a passenger vehicle positioned above the seat back of the vehicle adjacent the transverse ends of the seat. A pair of lower belts extends from the lower strap and are releasably connected to the frame of the seat.

BRIEF DESCRIPTION OF THE DRAWINGS

FIG. 3 is a side elevational view of the net attached within a passenger vehicle;

FIG. 4 is an enlarged side view of a portion of the vehicle seat showing the connection of the net to the seat; and FIG. 5 is a sectional view through the floor of the vehicle showing an alternative arrangement for connection of the net to the vehicle.

DESCRIPTION OF THE PREFERRED EMBODIMENT

Figure 1:
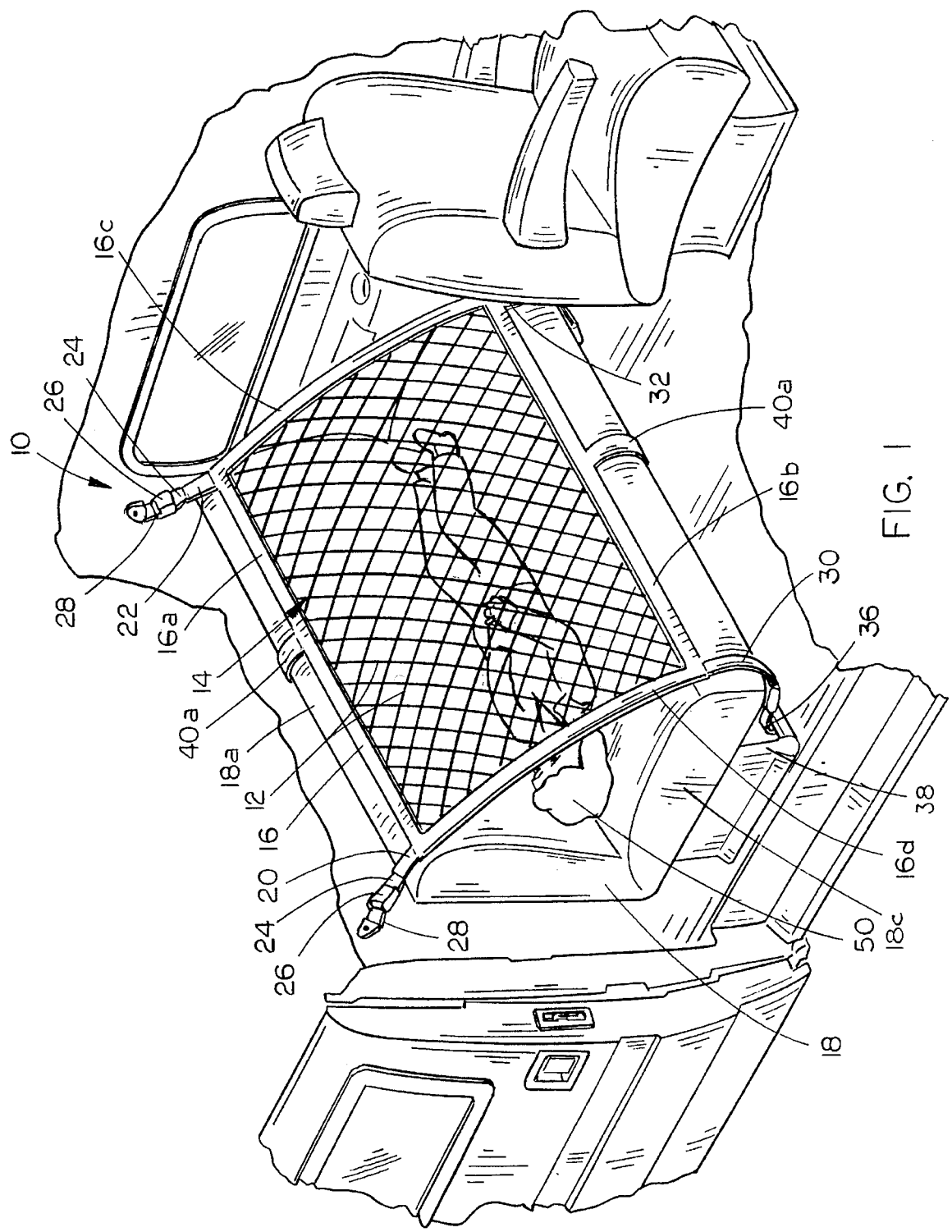
FIG. 1 is a perspective view of the restraining net of the present invention, attached in a passenger vehicle.

Referring now to the drawings, in which similar or corresponding parts are identified with the same reference numeral, and more particularly to FIG. 1, the restraining net of the present invention is designated generally at 10 and includes a plurality of flexible strands 12 connected to each other at a plurality of points forming a screen-like mesh 14 extending within a rectangular support frame 16.

Support frame 16 is formed of a pair of upper and lower longitudinal straps 16a and 16b and a pair of transverse end straps 16c and 16d, forming a rectangular frame work upon which mesh 14 is affixed. Mesh 14, and support frame 16, provide sufficient strength to meet or exceed the load restraining requirements to restrain children or adults while sleeping on a passenger vehicle seat 18, as shown in FIG. 1.

A pair of upper attachment belts 20 and 22 are affixed to the upper strap 16a of support frame 16 and project upwardly therefrom. Each attachment belt 20 and 22 is threaded through an adjustment buckle 24 mounted on a conventional seat belt fastener 26 to permit length adjustment of attachment belts 20 and 22 between support frame 16 and the associated seat belt fastener 26. Seat belt fasteners 26 permit releasable connection of upper attachment belts 20 and 22 to the shoulder belts 28 (shown in FIG. 1) located above the seat back 18a of a conventional passenger vehicle.

Figure 2:
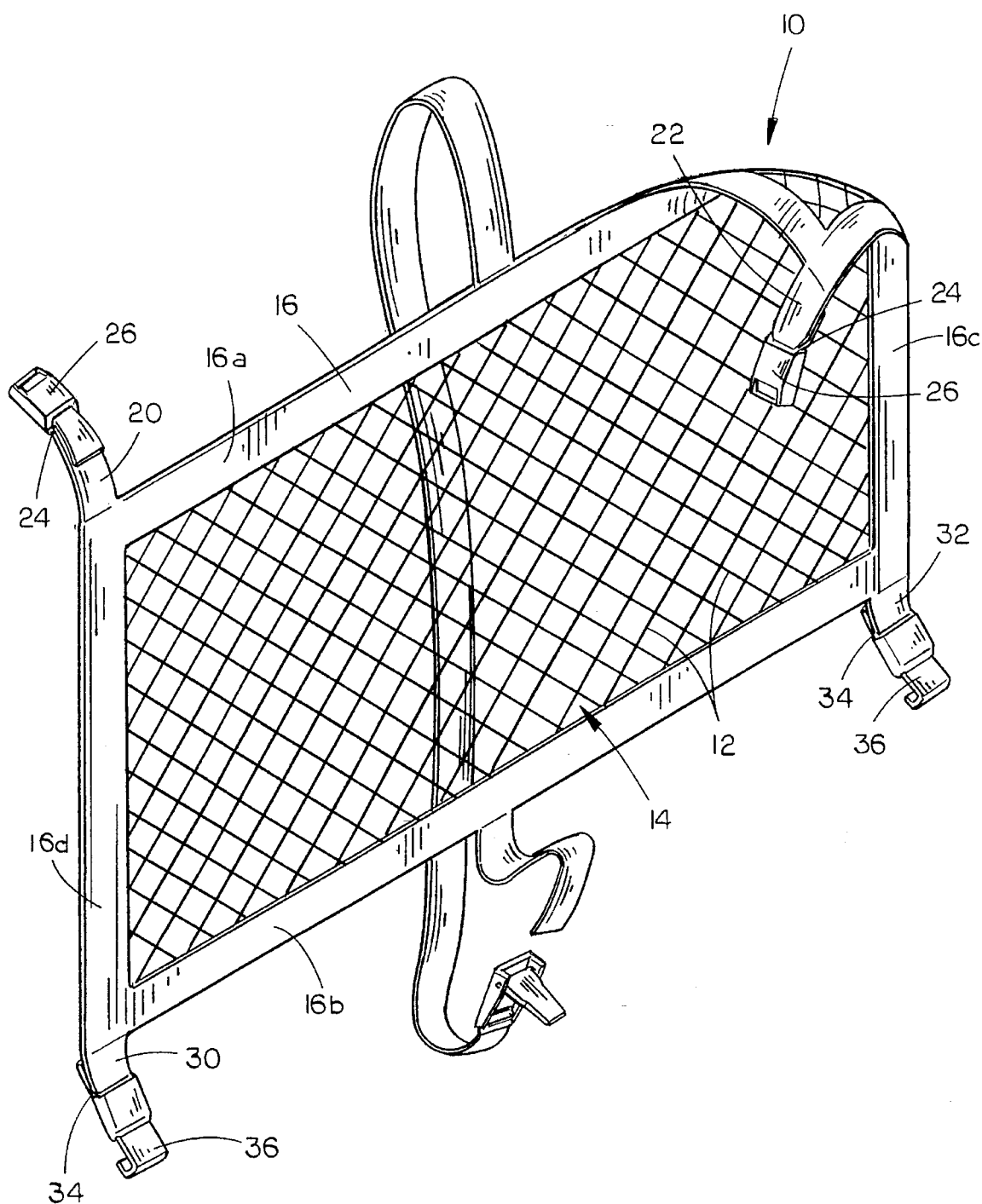
FIG. 2 is a perspective view of the restraining net.

A pair of lower attachment belts 30 and 32 are affixed to lower strap 16b of support frame 16, and extend downwardly therefrom. As shown in FIG. 2, lower attachment belts 30 and 32 are threaded through adjustment buckles 34 affixed to hook members 36, to permit length adjustment of lower attachment belts 30 and 32 between hooks 36 and support frame 16. As shown in FIGS. 3 and 4, hooks 36 will engage a horizontal frame member 38 forming part of the structural base 18b of vehicle seat 18.

In many cases, the length of net 10 is such as to require an intermediate support belt 40, as shown in FIG. 1, to assist in retaining mesh 14 in position on the vehicle seat. Intermediate support belt 40 has one end 40a attached generally centrally between lower attachment belts 30 and 32 along lower support frame strap 16b. The opposing end 40b of intermediate support belt 40 is threaded through an adjustment buckle 42 attached to a conventional seat belt fastener tongue 44, to permit length adjustment of support belt 40. An auxiliary belt 46 extends from upper support frame strap 16a, generally midway between upper attachment belts 20 and 22. The lower end of auxiliary belt 46 has a conventional operable seat belt fastener 48 affixed thereto which will selectively lock onto fastener tongue 44 on intermediate support belt 40.

Referring now to FIGS. 1 and 3, it can be seen that a person 50 may lay down upon the seat bottom 18c, against seat back 18a and be restrained from being thrown off seat 18 by restraining net 10. Hooks 36 are first connected to vehicle seat frame member 38, and then upper attachment belts 20 and 22 are connected to the vehicle shoulder belts 28, to position mesh 14 from the upper end of seat back 18a to the forward end of seat bottom 18c. Each of the attachment belts 20, 22, 30 and 32 may then be adjusted to tighten mesh 14 securely into position. Intermediate support belt 40 is then wrapped around the vehicle seat 18 and connected to auxiliary belt 46, to provide additional restraint generally centrally between the transverse ends 16c and 16d of support frame 16. In the event of a sudden stop, conventional shoulder belts 28 will lock, preventing net 10 from moving away from its position shown in FIG. 3. Thus, the individual 50 on seat 18 will be retained on the seat.

Referring now to FIG. 5, a separate floor anchor 52 may also be provided for attachment of lower attachment belts 30 and 32. Such floor anchors may be provided in new vehicles, specifically for the attachment of hooks 36 of the lower attachment belts 30 and 32. Each floor anchor 52 includes a slot 54 formed in the floor 56 of the vehicle, with a pin 58 extending horizontally between the walls of the slot. In this way, hooks 36 may be hooked on pin 58 to engage the net 10 with the floor 56 of the vehicle.

Whereas the invention has been shown and described in connection with the preferred embodiments thereof, many modifications, additions and substitutions may be made which are within the intended broad scope of the appended claims.

I claim:

1. A restraining net for passenger vehicles, comprising:

a generally rectangular mesh of strands, said mesh having opposing upper and lower longitudinal edges and opposing transverse side edges;

first and second spaced apart upper belts having a first end attached to the upper edge of said mesh and a second end projecting therefrom;

means on the second ends of said upper belts for releasably connecting the upper belts to shoulder seat belts in a passenger vehicle;

third and fourth spaced apart lower belts having a first end attached to the lower edge of said mesh and a second end projecting therefrom;

means on the second ends of said lower belts for releasably connecting the lower belts to a seat frame of a passenger vehicle;

a support frame attached continuously along the longitudinal and transverse edges of the mesh, including upper and lower straps attached along the longitudinal edges of the mesh and transverse end straps affixed along the transverse side edges of the mesh, said upper and lower belts having their first ends secured to said upper and lower straps respectively;

an intermediate support belt having a first end connected to the lower strap intermediate the lower belts, and a second end projecting therefrom;

an auxiliary belt having a first end connected to the upper strap intermediate the upper belts, and a second end projecting therefrom; and a releasable fastener having a first half attached to the second end of the intermediate support belt and a second half attached to the second end of the auxiliary belt for selective releasable interconnection.

2. The restraining net of claim 1, wherein said strands are interconnected to form a screen-like mesh.

3. The net of claim 1, further comprising length adjustment buckles attached to said releasable connecting means on the second ends of the upper belts, and wherein said upper belt second ends are threaded through said buckles for selective length adjustment.

4. The net of claim 1, wherein said releasable connecting means on the second ends of said lower belts includes a hook member affixed to each said lower belt.

5. The net of claim 4, further comprising length adjustment buckles attached to the hook members and wherein said lower belts are threaded through said buckles for selective length adjustment.

6. The net of claim 1, further comprising a length adjustment buckle attached to the first half of the releasable fastener, and wherein said intermediate support belt is threaded through the adjustment buckle for selective adjustment of the length thereof.

\* \* \* \* \*